INVENTOR.
Robert H. Kraft
BY

INVENTOR.
Robert H. Kraft

United States Patent Office 2,984,470
Patented May 16, 1961

2,984,470

CONVEYOR STRUCTURE FOR CONTINUOUS MINER

Robert H. Kraft, Palos Heights, Ill., assignor to Goodman Manufacturing Company, Chicago, Ill., a corporation of Illinois Filed Oct. 28, 1959, Ser. No. 849,328

3 Claims. (Cl. 262—7)

This invention relates to improvements in continuous mining machines of the multiple boring type adapted to cut contiguous bores in advance of the machine, and more particularly relates to such machines in which the working height of the machine is variable.

A principal object of the present invention is to provide an improved conveyor structure for continuous mining machines of the boring type having a lower vertically adjustable trimmer bar for cutting along the mine floor, in which the conveyor structure is so arranged as to accommodate free adjustment of the machine for various cutting heights, without interfering with the operation of the conveyor and to accommodate the receiving end of the conveyor to be positioned in closer relation to the working face than formerly.

Another object of the invention is to provide a mining machine of the class described having a tiltable cutter frame projecting forwardly of the main frame of the machine and a lower cutter bar mounted thereon for vertical adjustment with respect to the cutter frame, together with an inclined conveyor structure conveying the mined material away from the working face, having a slidable and tiltable connection intermediate the ends of the conveyor structure, and positioning the axis of tilting movement of the receiving end portion of the conveyor structure closely adjacent the axis of tilting movement of the cutter frame, to reduce the angularity in movement between the cutter frame and inclined receiving end portion of the conveyor, and to thereby accommodate the receiving end of the conveyor to be positioned closely adjacent the working face.

Still another object of the invention is to provide an improved and simplified construction and arrangement of elevating conveyor structure for a continuous mining machine, having one portion of the conveyor slidable and rockable with respect to the other and so arranged as to accommodate the conveyor to conform to variations in lateral and vertical tilting adjustment of the cutter frame relative to the main frame of the machine, and to position the receiving end portion of the conveyor closer to the working face than has heretofore been considered possible.

These and other objects of the invention will appear from time to time as the following specification proceeds and with reference to the accompanying drawings wherein.

Figure 1:
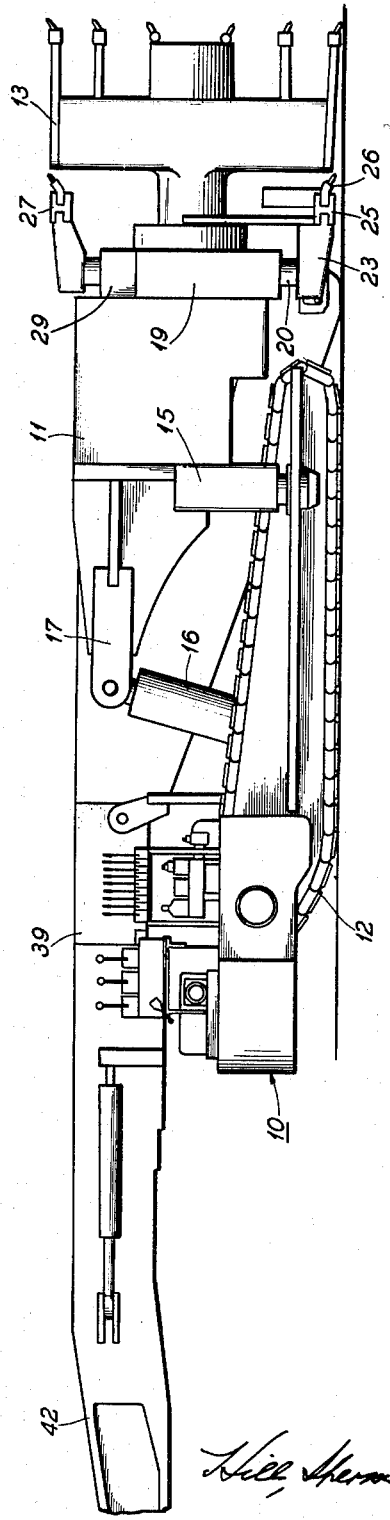
Figure 1 is a view in side elevation of a continuous boring type of mining machine constructed in accordance with a preferred embodiment of the invention.
Figure 3:
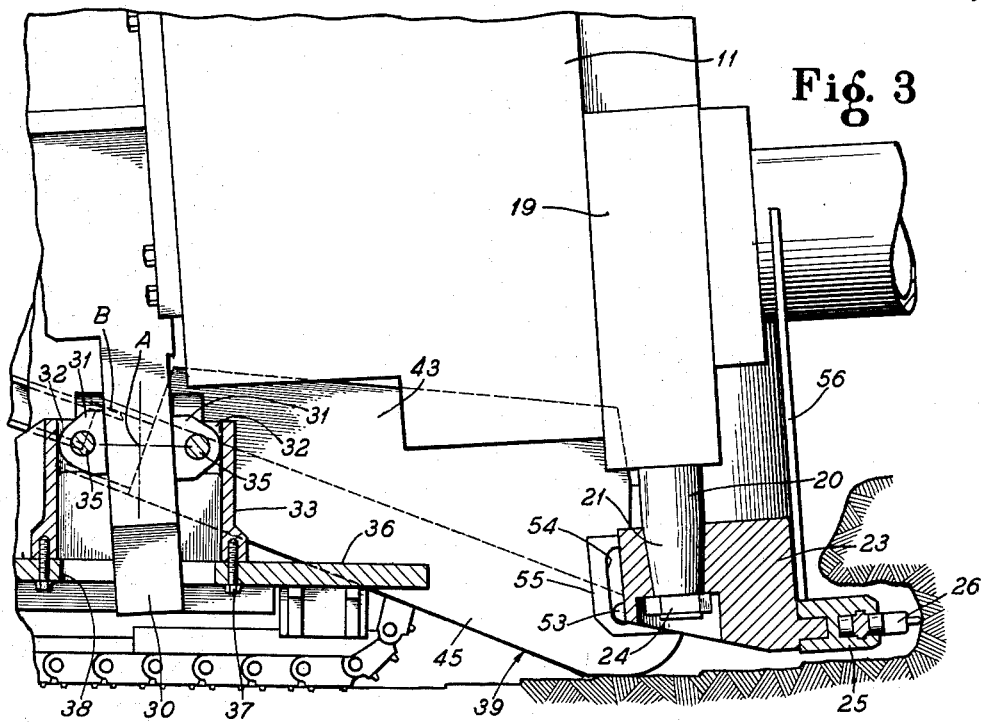
Figure 4:
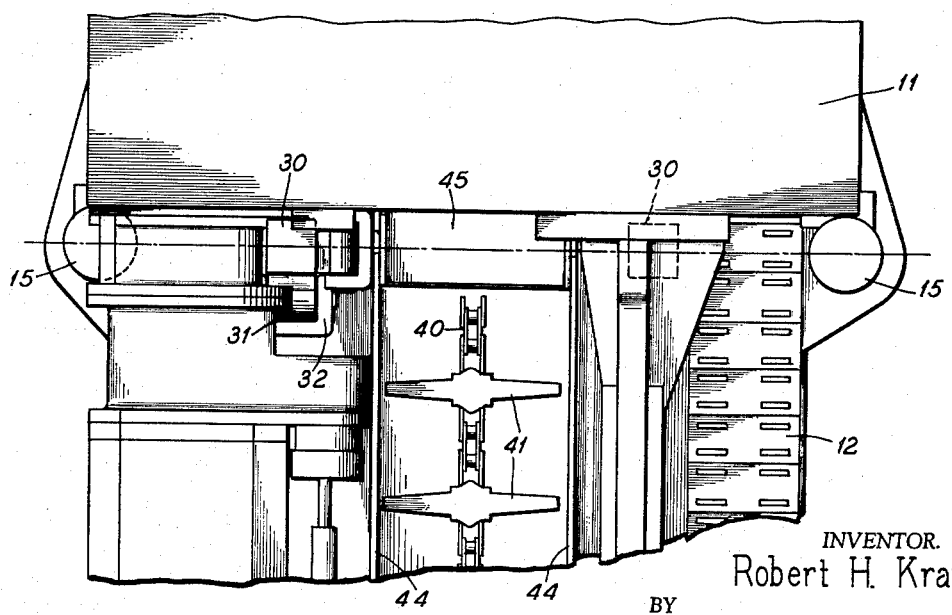

Figure 3 is a fragmentary view in side elevation of the forward end portion of the machine shown in Figure 1, showing the cutter frame in a tilted position with respect to the main frame, and showing certain parts of the cutter frame and main frame in longitudinal section; and Figure 4 is an enlarged fragmentary plan view of the forward end portion of the machine shown in Figure 1, with certain parts thereof broken away.

In the embodiment of the invention illustrated in the drawings, 10 generally designates a mobile base or main frame having a cutter frame 11 supported thereon and extending in advance thereof, and mounted on the base frame 10 for vertical adjustment with respect thereto, and for angular adjustment about axes extending transversely of said base frame.

The base frame 10 is supported on laterally spaced continuous traction tread devices 12, which serve to transport the machine along the ground from working place to working place and to feed boring heads 13, mounted on and projecting forwardly of the cutter frame 11 to cut contiguous bores in the working face in a manner well known to those skilled in the art, so not herein shown or described further.

The cutter frame 11 is generally shown in Figure 1 as being supported on the main frame 10 on a pair of laterally spaced vertically extending hydraulic jacks 15. The hydraulic jacks 15 are located adjacent the opposite rear corners of the cutter frame 11 and have pivotal connection with the base frame 10 in a manner similar to that shown and described in Patent No. 2,757,917, dated August 7, 1956, and assigned to the assignee of the present application.

Limited forward and rear tilting movement of the cutter frame 11 is effected by a pair of hydraulic jacks 16 transversely pivoted to the main frame 11 at their lower ends, and connected at their upper ends to arms 17 extending rearwardly of the cutter frame 11, as in the aforementioned Patent No. 2,757,917.

Lateral and vertical tilting adjustment of the cutter frame 11 may thus be effected independently of, or in conjunction with each other by selected control of the hydraulic jacks 15 and 16 respectively, each supplied by hydraulic pressure from a suitable source of supply, under control of conventional valve means, which need not herein be shown or described, since they form no part of the present invention.

Hydraulic jacks 19 extend vertically along opposite sides of the forward end portion of the cutter frame 11 and have piston rods 20 depending therefrom having tapered lower end portions 21 extending vertically through a transverse cutter bar support frame 23 and secured thereto as by nuts 24, threaded on the lower ends thereof. The cutter bar support frame 23 has a cutter bar 25 extending thereacross, at the lower end portion thereof. A cutter chain 26 is guided for movement along said cutter bar for trimming the upstanding cusps left between the boring heads 13. The cutter chain 26 is likewise guided from the cutter bar 25 upwardly to and along an upper cutter or trimmer bar 27 for trimming the depending cusps left between the boring heads 13 during the mining operation as is customary with boring types of continuous mining machines. The upper cutter bar 27 is supported on hydraulic jacks 29, adjustably moving said cutter bar to accommodate adjustment of the machine for various heights of material to be mined, in a manner well known to those skilled in the art, so not herein shown or described further.

The axial thrusts of boring of the boring heads 13 are taken on two laterally spaced pusher posts 30, depending from the cutter frame 11, adjacent the rear end thereof. The centers of the pusher posts 30 are shown in Figure 4 as being spaced inwardly of the centers of the hydraulic jacks 15 and as being in alignment therewith. The pusher posts 30 are shown as being substantially square in cross-section and slidably engage tiltable thrust absorbing shoes 31, 31 at their forward and rear faces. The thrust absorbing shoes 31 are mounted within a hollow thrust absorbing frame 33 on pivot pins 35, supported on ears 32 extending inwardly of said hollow frame. The hollow thrust absorbing frames 33 are in turn mounted on a bottom plate 36 of the main frame 10, as by machine screws 37, and extend about open portions 38 of the bottom plate 36, to accommodate vertical movement of the pusher posts 30 beneath said bottom plate upon vertical adjustment of the cutter frame 11. The pusher posts 30 thus in effect transmit the thrusts of boring to the main frame 10 in alignment with the pivot of the cutter frame 11 and pivot about said axis upon tilting movement of said cutter frame, by operation of the tilting jacks 16.

An endless conveyor 39 extends along the main frame 10 from a position adjacent the ground in advance of said main frame, rearwardly of the boring heads 13, but closely adjacent the cutter bar 25, to pick-up the mined material and load the mined material from a laterally swingable discharge end 42 thereof, into conveyors, shuttle cars or the like.

The conveyor 39 may be a laterally flexible center strand chain and flight type of conveyor to accommodate lateral adjustable movement of the discharge end portion 42 thereof, and includes a center strand endless chain 40 having spaced flights 41 projecting laterally from opposite sides of said chain and guided at their ends between laterally spaced side walls 43, extending along opposite sides of an inclined pick-up or gathering section 45 of the conveyor, and between side walls 44 extending from the side walls 43 upwardly and along the main frame 10 to and along the movable discharge end portion 42 of the conveyor. The chain 40 may be driven by a suitable motor (not shown) in a conventional manner and turns about a direction changing device 46 at the forward end of the inclined pick-up section 45 and extends upwardly therefrom along a bottom plate 47 extending between the side walls 43, and along an inclined bottom plate 48 extending between the side walls 44.

Figure 2:
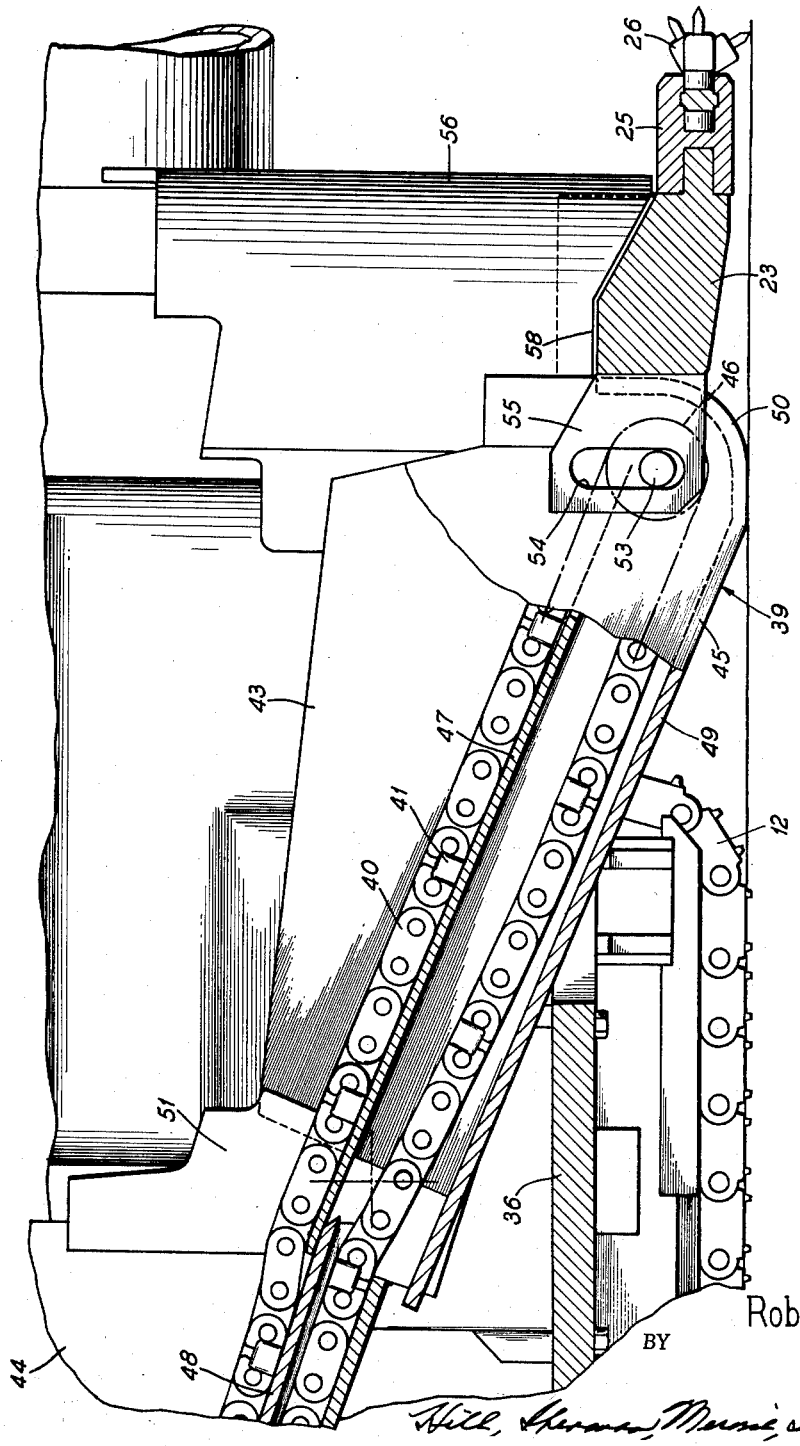
Figure 2 is an enlarged fragmentary sectional view of the forward end portion of the machine shown in Figure 1, showing parts of the conveyor in longitudinal section.

The inclined pick-up or gathering section of the conveyor, as shown in Figure 2, includes an inclined box-like frame structure having an inclined bottom plate 49 spaced beneath the lower run of the chain 40, and terminating at its forward end into an upwardly curved portion 50 generally conforming to the path of travel of the chain 40 around the direction changing idler 46 and slidably engaging the ground at its lower end portion. The side walls 43 extend upwardly from opposite sides of the bottom plate 49 for substantially the length thereof and upwardly along opposite sides of the materal carrying plate 47 and vertically therefrom a substantial distance, to retain the mined material on the conveyor to be moved upwardly therealong to the rear end of the machine, by the chain 40 and flights 41.

The side walls 43 are shown in Figure 2 as terminating at their upper end portions in retainer plates 51 extending upwardly from the material carrying plate 47 and welded or otherwise secured thereto and to the rear end portions of the side plates 43. The retainer plates 51 have slidable engagement with the insides of the side walls 44, and serve to close the gaps between the side walls 43 and 44 for the full range of tilting movement of the inclined pick-up section of the conveyor.

The side plates 43 have bearing pins 53 extending laterally therefrom in opposite directions and shown as being coaxial with the axis of the direction changing device 46. The bearing pins 53 extend through elongated vertically extending slots 54, in upright ears 55, 55 extending along opposite sides of the conveyor and rearwardly of the cutter bar support 23. The cutter bar support 23 is preferably cut away between the ears 55, 55 to form a dished area 58 in said cutter bar support between opposite upright pusher plate 56, extending in advance of opposite sides of the conveyor 39 over the front of the cutter bar support 23, to facilitate the progress of the cuttings from the mine floor onto the pick-up section of the conveyor.

The material carrying plate 47 slides along and pivots about the forward end portion of the material carrying plate 48 as the cutter bar 23 is vertically adjusted by operation of the hydraulic jacks 19 and as the cutter frame 11 is tilted by operation of the tilting jacks 16.

In Figure 3, the cutter frame 11 and cutter bar 25 are shown as being tilted upwardly with respect to the ground, to accommodate the cutter bar 25 to conform to an upwardly inclined grade. In this figure, the pivot of the cutter frame 11 is indicated by point A at the intersection of right angled center lines. The average pivot of the inclined pick-up portion of the conveyor is indicated by point B.

It may be seen from Figure 3 that the pivot of the inclined pick-up section of the conveyor is closely adjacent the pivot of the cutter frame 11, with the result that relative angular movement of the pick-up section of the conveyor with respect to the cutter frame 11 is reduced to a minimum. Also, since the pick-up section of the conveyor is slidably and pivotally engageable with the forward end portion of the bottom plate 48 it is not necessary to compensate for angularity in movement of the pick-up section of the conveyor with respect to the cutter bar support 23, upon vertical adjustable movement of the cutter bar 25 with respect to the ground, thus making it possible to position the receiving end of the pick-up section closely adjacent the cutter bar 25.

It may further be seen that the floating supporting connection between the forward end portion of the plate 48 and the plate 47 provides a free pivotal support for the rear end portion of the pick-up section of the conveyor, and eliminates binding at the joint between the two sections of the conveyor that would be prevalent with a telescopic conveyor, as well as making it unnecessary to compensate for angularity in movement of the pick-up section of the conveyor at its point of connection to the cutter bar support 23.

It should also be noted that since the direction changing device 46 moves in a substantially vertical path during vertical adjustable movement of the cutter bar 25, that there will be some shortening of the path of travel traversed by the conveyor chain 40 as the direction changing device 46 is elevated. The conveyor, however, is not operated in the extreme upper position of the cutter bar 25 so slack in the conveyor chain in this position is not a problem. The conveyor chain 40 also may be adjusted for a mean cutting position of the cutter bar 25. There, therefore, will be little, if any, tendency to stretch the conveyor chain 40 as the cutter bar 25 is in its lowermost position of adjustment.

While I have herein shown and described one form in which my invention may be embodied, it should be understood that various modifications and variations in the invention may be effected without departing from the spirit and scope of the novel concepts of the invention, as defined by the claims appended hereto.

I claim as my invention:

1. In a continuous mining machine, a base frame, a cutter frame mounted on the forward end of said base frame and extending in advance thereof, a horizontally disposed cutter bar depending from said cutter frame and extending across said base frame in advance thereof and mounted on said cutter frame for vertical adjustable movement with respect thereto, a conveyor extending along said base frame, said conveyor having a fixed inclined trough section having a forward end portion terminating rearwardly of said cutter bar and having a movable inclined pick-up section forming a forward continuation of said forward end portion and extending downwardly to a position adjacent said cutter bar, a vertically slidable pin and slot connection between the forward end portion of said pick-up section and said cutter bar, and a freely slidable supporting connection between the forward end portion of said inclined trough section and said pick-up section accommodating free vertical angular movement of said pick-up section with respect to said inclined trough section about a movable horizontal axis disposed adjacent the forward end portion of said fixed inclined trough section, upon vertical adjustable movement of said cutter bar.

2. In a continuous mining machine, a base frame, a cutter frame mounted on the forward end of said base frame for tilting movement with respect thereto about an axis extending transversely of said base frame and disposed adjacent the forward end thereof, a horizontally disposed cutter bar depending from said cutter frame and mounted thereon for vertical adjustable movement with respect thereto, a conveyor extending along said base frame and having a fixed inclined section spaced a substantial distance rearwardly of said cutter bar and an inclined pick-up section movably mounted on said fixed inclined section, and forming a forward continuation thereof, vertically slidable connections between the forward end of said pick-up section and said cutter bar accommodating lateral tilting movement of said cutter frame with respect to said pick-up section, a movable inclined bottom plate forming the material carrying portion of said pick-up section, and a fixed inclined bottom plate forming the material carrying portion of said fixed inclined section of said conveyor and terminating closely adjacent the transverse axis of pivotal movement of said cutter frame, said fixed inclined bottom plate forming at its forward end portion a support for said movable inclined bottom plate, supporting said pick-up section for rockable and slidable movement with respect to said bottom plate of said fixed section about the forward end portion of said bottom plate.

3. In a mining machine, a main frame, a cutter frame mounted on the forward end of said main frame for tilting movement with respect thereto about an axis extending transversely of said main frame and disposed adjacent the forward end thereof, a horizontally disposed cutter bar spaced beneath said cutter frame and extending across the forward end of said main frame, jack means supporting said cutter bar on said cutter frame and vertically moving said cutter bar with respect thereto, a conveyor extending along said main frame and having a fixed inclined section of a box-like structure having an inclined material carrying plate terminating adjacent the transverse axis of tilting movement of said cutter frame and side walls extending upwardly from opposite sides thereof, a movable inclined pick-up section extending in advance of said fixed inclined section, said movable pick-up portion including a material carrying plate and side walls extending vertically therefrom and having slidable engagement with the side walls of said fixed section, a chain having spaced flights movable along said fixed and pick-up sections of said conveyor, a direction changing idler about which said chain and flights turn at the forward end of said pick-up section, disposed closely adjacent said cutter bar, spaced slotted connecting members extending from said cutter bar and having upright slots therein, pins extending laterally from said side walls of said pick-up section through said slots, and a slidable supporting connection between said material carrying plate of said fixed section and said material carrying plate of said pick-up section, accommodating vertical angular movement of said pick-up section about the forward end portion of said bottom plate of said fixed section and positioning the axis of rocking movement of said pick-up section adjacent the transverse axis of tilting movement of said cutter frame.

References Cited in the file of this patent
UNITED STATES PATENTS
2,736,547    Gonski ---------------- Feb. 28, 1956